United States Patent
Zhu

(10) Patent No.: US 10,089,847 B2
(45) Date of Patent: Oct. 2, 2018

(54) WEARABLE DEVICE AND METHOD THEREFOR

(71) Applicant: Baodong Zhu, Beijing (CN)

(72) Inventor: Baodong Zhu, Beijing (CN)

( * ) Notice: Subject to any disclaimer, the term of this patent is extended or adjusted under 35 U.S.C. 154(b) by 0 days.

(21) Appl. No.: 15/622,165

(22) Filed: Jun. 14, 2017

(65) Prior Publication Data
US 2017/0352241 A1 Dec. 7, 2017

Related U.S. Application Data

(63) Continuation of application No. PCT/CN2016/000079, filed on Feb. 15, 2016.

(51) Int. Cl.
| | |
|---|---|
| *H04N 7/15* | (2006.01) |
| *G08B 21/04* | (2006.01) |
| *G08B 21/02* | (2006.01) |
| *H04W 4/90* | (2018.01) |
| *G08B 25/01* | (2006.01) |
| *H04N 7/14* | (2006.01) |
| *H04N 5/232* | (2006.01) |
| *H04M 1/725* | (2006.01) |

(52) U.S. Cl.
CPC ......... *G08B 21/0446* (2013.01); *G08B 21/02* (2013.01); *G08B 25/016* (2013.01); *H04N 7/147* (2013.01); *H04W 4/90* (2018.02); *H04M 1/7253* (2013.01); *H04N 5/23258* (2013.01)

(58) Field of Classification Search
None
See application file for complete search history.

(56) References Cited

U.S. PATENT DOCUMENTS

| | | | |
|---|---|---|---|
| 2016/0127641 A1* | 5/2016 | Gove | G06T 1/0007 348/143 |
| 2017/0206620 A1* | 7/2017 | Braun | G06Q 50/265 |
| 2017/0251986 A1* | 9/2017 | Yamaji | A61B 5/743 |
| 2017/0264667 A1* | 9/2017 | Thomas | H04L 67/06 |
| 2017/0310775 A1* | 10/2017 | Tatourian | H04W 4/006 |

* cited by examiner

*Primary Examiner* — Creighton Smith
(74) *Attorney, Agent, or Firm* — Wayne & Ken, LLC; Tony Hom

(57) ABSTRACT

A wearable device and method therefor. The wearable device comprises a processing unit, a storage unit, a positioning unit, a sensing unit, a communication unit, a power supply unit, a vibrator, a camera, a microphone, a loudspeaker and an emergency press key. The device detects the geographic location, body posture, and movepeoplet state, measures the forces applied on the device, and determines, on the basis of the comparison of the inclination angle value, acceleration value, and duration with corresponding thresholds in combination with the positive/negative signs of the duration and acceleration value, whether the device user is in the normal, abnormal or dangerous state. In case of the abnormal or dangerous state, different alert signals transmitted rescue cell phone and audiovisual communication can be enabled with the rescue cell phone, such that the device user can obtain help as soon as possible in different accidents.

10 Claims, 4 Drawing Sheets

WEARABLE DEVICE AND METHOD THEREFOR

FIELD OF THE INVENTION

The present invention relates to the technical field of intelligent terminals, and more specifically, to a wearable device with safety function and a method thereof.

BACKGROUND OF THE INVENTION

A safety problem is a big problem around the whole life of people. Not only the safety of the old and children, but also the safety of everyone including them should be concerned. Without safety, nothing exists.

The old: when an old people falls down, many people do not dare to pull the old people up outside, and no one knows in home, so that precious rescue time may be delayed, resulting in a serious consequence and even death. when sick in home alone and not capable of moving, the old people cannot call their children and relatives and cannot get a drink of water even, and more even, no one knows for a long time if the old people die in home; if the old people have senile disease and cannot find the way home, the family looks for the old people everywhere, but the old people may not be found and disappear finally; and all of these make children who struggle for life and future always worried.

Children: a little carelessness could make the children lost and even abducted and not found back any more when the children are taken outsides, resulting in a lifetime of pain for parents; and the problems that the children may be hit and hurt, etc. outsides also disturb the parents.

Female students: a tragedy of loss of communication and final murdering happens again and again, which is heartbreaking.

Other people: events of being attacked and kidnapped happen frequently; sudden death of office workers often occurs; people cannot move after encountering a car accident while nobody knows if driving a car in a remote place; situations that a person stays outside alone, travellers are separated or a lone traveller is in distress and attacked while nobody knows and some other dangerous conditions will result in an unimaginable consequence finally if golden period for rescue is missed.

If dangers can be discovered in time when the old people falls down, cannot move with a disease or cannot find the way home, when the children are lost and even abducted, hit and hurt, when the female students are in loss of communication and when all the people including the old people, the children and the female students encounter the conditions of the car accident, dangerous circumstances, sudden death, attack or kidnap and the like, rescue can be rapidly carried out, so that the safety can be guaranteed, and the life can be saved.

In view of the problems that the old people get lost and fall down and the children are lost and abducted, a lot of positioning products such as positioning watches occur in the market at present. A manual alarm press key is designed for all the products; the products may also automatically generate an alarm when a safety range is exceeded by setting the safety range; and some other products have a monitoring or talking function. But people, particularly the children and the old people are in a panic state when in dangerous circumstances, they cannot manually send the alarm basically, and the alarm button becomes a decoration at this time and cannot come in handy; and hands and feet may not move or people may be in a comatose or semi-comatose state when in dangerous circumstances, people simply cannot manually send the alarm at the mopeoplet. In addition, the products can generate the alarm only when the preset safety range is exceeded, and users will loss protection completely once the products are taken off by someone and thrown in the range or the products are lost in the range and emergency contacts do not know the situation at all. Furthermore, on the aspects that people are in dangerous circumstances, are attacked, encounter the car accident, are kidnapped, encounter sudden death, are in loss of communication and the like, the products are helpless obviously because the products do not have the automatic detection and judgpeoplet function and cannot discover occurrence of the dangerous circumstances. Even if some products have the alarm press key and the voice communication function, people cannot use the products when the dangerous circumstances occur as previously peopletioned.

Therefore, it makes a lot of sense to invent a device which may rapidly discover the dangerous circumstances and automatically generate the alarm to seek fastest rescue when people encounter various abnormal or dangerous conditions peopletioned above.

SUMMARY OF THE INVENTION

Technical Problem

In view of the above problems, the present invention proposes a wearable safety device and a method thereof.

Technical Solution

The wearable safety device and a smart phone commonly act to form a set of system, and an APP matched with the wearable safety device is installed in a smart phone. Two kinds of smart phones exist. One kind is used as a communication relay and called an auxiliary mobile phone, and the other kind is used for accepting alarm finally and called a rescue mobile phone. The wearable safety device has two kinds of design. One kind is an independent design, and the other kind is a non-independent design. The wearable safety device with the independent design is in direct communication with the rescue mobile phone, and the wearable safety device with the non-independent design is in communication with the rescue mobile phone through an auxiliary mobile phone.

The wearable safety device with the independent design is composed of following units: a processing unit, a positioning unit, a sensing unit, a communication unit, a camera, a microphone, a loudspeaker and a power supply unit and may also comprise an emergency press key, a storage unit and a vibrator, wherein the sensing unit comprises an accelerometer and a gyroscope, and wherein the communication unit comprises 3G and/or 4G.

Except the communication unit, the wearable safety device with the non-independent design is the same as the wearable safety device with the independent design, and the communication unit comprises a bluetooth.

The positioning unit is used for positioning and giving date and time information, and the sensing unit is used for detecting the posture and the motion condition of a human body and the magnitude of the acting force applied to the wearable safety device and is also used for carrying out matching work of inertial navigation and the positioning unit.

Several rescue mobile phone numbers are preset in the wearable safety device; the device sends position, and date and time information to each rescue mobile phone according to a set time interval; an electronic map APP of each rescue mobile phone receives and stores the information and may display the position and the corresponding date and time information in real time and generate a path automatically when running in the foreground. If not receiving the information within a certain time, the rescue mobile phones may generate an alarm optionally by vibration, vibration and voice or voice.

The processing unit in the device is used for calculating a g value and an included angle θ between an upper body of a human body and a vertical plane according to data detected by the sensing unit, distinguishing a time quantum, comparing θ, g, duration and a corresponding threshold to judge whether a human body is in a normal state, an abnormal state or a dangerous state and automatically starting an alarm program when the human body is in the abnormal state and the dangerous state: starting the camera and the microphone to work, sending the current position and date and time information at the same time, calling the rescue mobile phone preset in the device, sequentially calling a next rescue mobile phone if the previous rescue mobile phone does not get through and keeping going until one rescue mobile phone gets through (if no mobile communication signal exists at the time, stopping calling, closing the camera and the microphone with a time lag and starting the alarm program again until the signal exists); and carrying out real-time video and audio communication with the rescue mobile phone after the rescue mobile phone gets through; and meanwhile, the wearable safety device continuously sends the position and the date and time information to the rescue mobile phones periodically.

Under the emergency condition, a user of the wearable safety device may press the emergency press key or pat the wearable safety device to manually send alarm, and the alarm process and content are the same as automatic alarm in the dangerous state.

If a judgment criterion of the alarm does not change after the rescue mobile phone responds to the alarm, the same alarm which may be generated subsequently may be shielded; and if the judgement criterion changes, the same alarm generated subsequently may be started again.

An automatic alarm in a rest period may be set in a shielding state through the rescue mobile phones or the auxiliary mobile phones so as to meet the condition that some persons do not want to use the wearable safety device in the period.

In a non-alarm state, a person may carry out real-time video and audio communication with the device user or only look over monitoring data and may store the monitoring data by utilizing the rescue mobile phone to start and close the camera and the microphone of the wearable safety device through the APP. When the camera and the microphone of the wearable safety device are started and closed, the wearable safety device may send a prompt through vibration, vibration and voice or voice to respect the user and protect privacy of the user, and vibration and voice may be set by the rescue mobile phone.

Beneficial Effect

The prior art and products realize the automatic alarm when the preset range is exceeded only, and a manual alarm can be depended only under other emergency conditions. However, people and particularly children and old people are in a panic and alarmed state when encountering the emergency condition and basically cannot manually send alarm, such that the alarm button becomes a decoration at this time and cannot come in handy; hands and feet may not move or people may be in a comatose or semi-comatose state when people are in distress; and people simply cannot manually send the alarm at the mopeoplet. In addition, the products can generate the alarm only when the preset safety range is exceeded, and users will loss protection completely once the products are taken off by someone and thrown in the range or the products are lost in the range and emergency contacts do not know the situation at all. Furthermore, on the aspects that people are in distress, are attacked, encounter a car accident, are kidnapped, encounter sudden death, are in loss of communication and the like, the products are helpless obviously because the products do not have the automatic detection and judgpeoplet function and cannot discover occurrence of dangerous circumstances. Even if some products have the alarm press key and the voice communication function, people cannot use the products when the dangerous circumstances occur as previously peopletioned.

Compared with the prior art, the present invention may solve the problem that automatic alarm can be rapidly carried out for help when all the people including the old people and the children encounter various abnormal or dangerous conditions and the like and may also solve the problems which do not exist, cannot be solved and even never be thought at all in the prior art.

PREFERRED EMBODIMENT OF THE INVENTION

Figure 1:
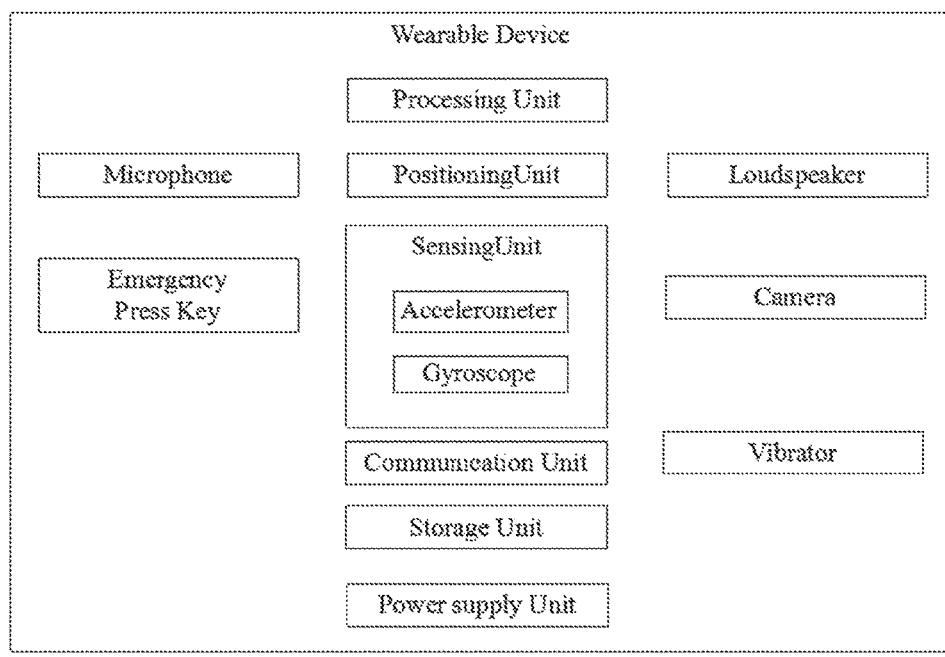
FIG. 1 is a block diagram of a wearable safety device.
Figure 2:
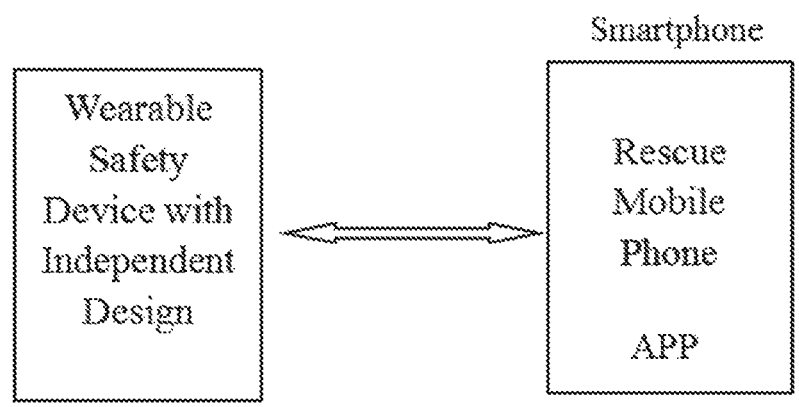
FIG. 2 is a system formed by a wearable safety device with independent design.
Figure 3:
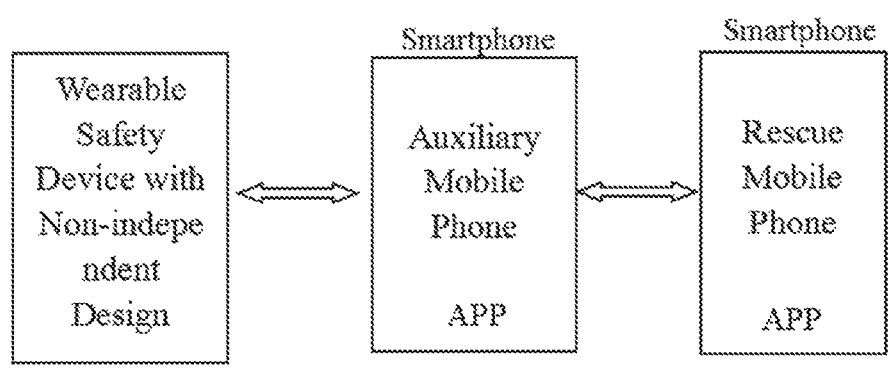
FIG. 3 is a system formed by a wearable safety device with non-independent design.

APP matched with the wearable safety device is installed in the rescue mobile phone and the auxiliary mobile phone.

The wearable safety device with the independent design is composed of the following unit: a processing unit, a positioning unit, a sensing unit, a communication unit, a camera, a microphone, a loudspeaker and a power supply unit and may also comprise an emergency press key, a vibrator and a storage unit, wherein the sensing unit comprises an accelerometer and a gyroscope, and wherein the communication unit comprises 3G and/or 4G. The positioning unit, the sensing unit, the communication unit and the power supply unit are connected with the processing unit.

Except the communication unit, the wearable safety device with the non-independent design is the same as the wearable safety device with the independent design, and the communication unit comprises a bluetooth.

As for the wearable safety device, the processing unit, the communication unit and the positioning unit may be independent and may also be completely or partly integrated in a SoC, preferably an integrated single SoC, and the SoC is smaller in area, lower in power consumption and better in performance and facilitates design at the same time. The accelerometer and the gyroscope may be independent three-axis sensors and may also be six-axis or nine-axis sensors integrated in a chip, preferably an integrated single chip which has the same advantages as the SoC.

The positioning unit is used for positioning and giving date and time information (converted into local date and time through the positioning unit), and the sensing unit is used for detecting the posture and the motion condition of a human body and the magnitude of the acting force applied to the wearable safety device and is also used for carrying out matching work of inertial navigation and the positioning unit so as to realize continuous positioning under the condition that the positioning unit loses a satellite signal.

I. Several rescue mobile phone numbers are preset in the wearable safety device; the device sends current position and date and time information to each rescue mobile phone according to a set time interval; an electronic map in APP running on each rescue mobile phone receives and stores the information and may display the position and the corresponding date and time information of the wearable safety device in real time and generate a path automatically when being switched to run in the foreground. If the wearable safety device cannot be in communication with a base station for a short while, the information is stored in the device temporarily and is sent again until the wearable safety device can be in communication with the base station. If not receiving the information within a certain time, the rescue mobile phones may generate an alarm optionally by vibration, vibration and voice or voice.

II. Automatic Alarm

An automatic alarm flow may be shown in FIG. 4 and is described in detail as follows.

The sensing unit is used for detecting the posture and the motion of a human body and the condition of the external force directly applied to the wearable safety device in real time and converting detected data into an electrical signal; the processing unit is used for collecting the signal, calculating θ and g values and carrying out analysis processing with combination of time so as to make correct judgpeoplet; and the processing process after judgpeoplet is in communication interaction with the rescue mobile phones through the communication unit, wherein the wearable safety device with the non-independent design is in indirect communication interaction with the rescue mobile phones through the auxiliary mobile phones.

Following parameters and values are defined firstly:

1. θ: an included angle between an upper body of a human body and a vertical plane, taking an absolute value. α, β: two thresholds of θ. $0°≤θ≤180°$, $0°<α<β<90°$.

2. g: the intense degree of an action of a wearable safety device user or the magnitude of the external force directly applied to the device. gx, gy and gz: components of g in an x axis, a y axis and a z axis of a space rectangular coordinate system respectively (the coordinate system is stationary), and g (x, y): gx or gy. G0, G1, G2 and G3: four thresholds of g, $0<G0<G1<G2<G3$.

3. t: current time. T: a motion or reset time quantum of the wearable safety device user in a day. Ta: motion time quantum, and Ts: rest time quantum. t and T: both ranging from 00:00 to 24:00. Td: duration of g in some threshold interval; Tt1, Tt2 and Tt3: three thresholds of Td, in seconds $0<Tt1<Tt2<Tt3$. The T value may be set by the rescue mobile phones, the auxiliary mobile phones or a computer.

(I). When t is in Ta time quantum:

1. if the posture of the human body is upright or in a slight leaning state, i.e. $θ<α$:

a. if $|g (x, y)|<G1$, and $Td≥Tt3$, the condition is judged to be abnormal;

b. if $G1≤|g (x, y)|<G3$, the condition is judged to be normal;

c. if $|g (x, y)|≥G3$, the condition is judged to be abnormal.

2. If the posture of the human body is in a leaning state, i.e. $α≤θ<β$:

a. if $|g (x, y)|<G1$ and $Td≥Tt3$, the condition is judged to be dangerous;

b. if $G1≤|g (x, y)|<G2$, g (x, y) is alternately positive and negative values, and $Td≥Tt2$, the condition is judged to be abnormal;

c. if $G2≤|g (x, y)|<G3$, the condition is judged to be normal;

d. if $|g (x, y)|≥G3$, the condition is judged to be abnormal.

3. If the posture of the human body greatly leans and is even horizontal, i.e. $β≤θ≤90°$:

a. if $|g (x, y)|<G1$ and $Td≥Tt3$, the condition is judged to be dangerous;

b. if $G1≤|g (x, y)|<G2$, g (x, y) is alternately positive and negative values, and $Td≥Tt2$, the condition is judged to be abnormal;

c. if $|g (x, y)|≥G2$, and g (x, y) is alternately positive and negative values, the condition is judged to be abnormal;

d. if $|g (x, y)|≥G3$, the condition is judged to be abnormal.

4. If the posture of the human body is that the upper body leans downward, i.e. $θ>90°$:

a. if $|g (x, y)|<G1$ and $Td≥Tt1$, the condition is judged to be dangerous;

b. if $|g (x, y)|≥G1$ and $Td≥Tt1$, the condition is judged to be abnormal.

(II). When t is in Ts time quantum (in this time quantum, $θ≥β$ generally):

1. if $|g (x, y)|<G1$, the condition is judged to be normal;

2. if $|g (x, y)|≥G1$, g (x, y) is alternately positive and negative values, and $Td≥Tt2$, the condition is judged to be abnormal;

3. if $|gz|≥G3$, the condition is judged to be dangerous.

(III). Regardless of the time quantum, if $|g (x, y)|≤G0$, the condition is judged to be abnormal.

(IV). Regardless of the time quantum, the condition is judged to be dangerous as long as the emergency button is pressed.

When the condition is judged to be normal, the wearable safety device does not make any reaction.

When the condition is judged to be abnormal, the wearable safety device automatically starts an abnormal alarm program: starting the camera and the microphone to work, recording a video and audio signal, sending the current position and date and time information at the same time, calling the rescue mobile phone preset in the device with a prompt of vibration, vibration and voice or voice (which may be set through the rescue mobile phones, the auxiliary mobile phones or the computer), sequentially calling a next rescue mobile phone if the previous rescue mobile phone does not get through within a certain time and keeping going until one rescue mobile phone gets through (if no mobile communication signal exists at the time, stopping calling, closing the camera and the microphone with a time lag and starting the alarm program again until the signal exists). After the rescue mobile phone gets through, the wearable safety device stops recording the video and audio signal and turns to carry out real-time video and audio communication with the rescue mobile phone. The called rescue mobile phone may generate vibration and/or sound alarm and may store communication contents when carrying out real-time communication. At the same time, the wearable safety device continuously sends the position and the date and time information to the rescue mobile phones periodically, and the electronic maps in the APP running in the backgrounds of the rescue mobile phones receive and store the information. A rescue mobile phone user may switch to the electronic map as needed, the position, corresponding to date and time, is displayed on the map, and a path is generated automatically. After real-time communication, video and audio contents recorded by the wearable safety device previously may be sent to the rescue mobile phone (used for purposes of evidences in some cases, etc.).

When the condition is judged to be dangerous, a processing mode is basically same as a processing mode when the condition is judged to be abnormal, and the difference is that an alarm sound and vibration generated by the APP of the called rescue mobile phone are different from those when the condition is judged to be abnormal, the voice may be more urgent, and vibration may be stronger.

If the judgment criterion of the alarm does not change after the rescue mobile phone responds to the alarm, the same alarm which may be generated subsequently may be shielded; and if the judgment criterion changes, the same alarm generated subsequently may be started again.

The automatic alarm in the rest period may be set in a shielding state through the rescue mobile phones or the auxiliary mobile phones so as to meet the condition that some persons do not want to use the wearable safety device in the period.

III. In a non-automatic alarm state, if needed, a rescue mobile phone user may send a command through the APP to start and close the camera and the microphone of the wearable safety device and carry out real-time video and audio communication with the device user or only look over monitoring data and may store the monitoring data. When the camera and the microphone of the wearable safety device are started and closed, the wearable safety device may send a prompt through vibration, vibration and voice or voice to respect the user and protect privacy of the user, and vibration and voice may be set by the rescue mobile phone.

DETAILED DESCRIPTION OF THE INVENTION

APP matched with the wearable safety device is installed in the rescue mobile phones and the auxiliary mobile phones.

The wearable safety device with the independent design is composed of the following unit: a processing unit, a positioning unit, a sensing unit, a communication unit, a camera, a microphone, a loudspeaker and a power supply and may also comprise an emergency press key, a vibrator and a storage unit, wherein the sensing unit comprises an accelerometer and a gyroscope, and wherein the communication unit comprises 3G and/or 4G. The positioning unit, the sensing unit, the communication unit and the power supply unit are connected with the processing unit.

Except the communication unit, the wearable safety device with the non-independent design is the same as the wearable safety device with the independent design, and the communication unit comprises a bluetooth.

As for the wearable safety device, the processing unit, the communication unit and the positioning unit may be independent and may also be completely or partly integrated in a SoC, preferably an integrated single SoC, and the SoC is smaller in area, lower in power consumption and better in performance and facilitates design at the same time. The accelerometer and the gyroscope may be independent three-axis sensors and may also be a six-axis or nine-axis sensors integrated in a chip, preferably an integrated single chip which has the same advantages as the SoC. The positioning unit is used for positioning and giving date and time information (converted into local date and time through the positioning unit), and the sensing unit is used for detecting the posture and the motion condition of a human body and the magnitude of the acting force applied to the wearable safety device and is also used for carrying out matching work of inertial navigation and the positioning unit so as to realize continuous positioning under the condition that the positioning unit loses a satellite signal.

I. Several rescue mobile phone numbers are preset in the wearable safety device; the device sends current position and date and time information to each rescue mobile phone according to a set time interval; an electronic map in APP running on each rescue mobile phone receives and stores the information and may display the position and the corresponding date and time information of the wearable safety device in real time and generate a path automatically when being switched to run in the foreground. If the wearable safety device cannot be in communication with a base station for a short while, the information is stored in the device temporarily and is sent again until the wearable safety device can be in communication with the base station. If not receiving the information within a certain time, the rescue mobile phones may generate an alarm optionally by vibration, vibration and voice or voice.

II. Automatic Alarm

Figure 4:
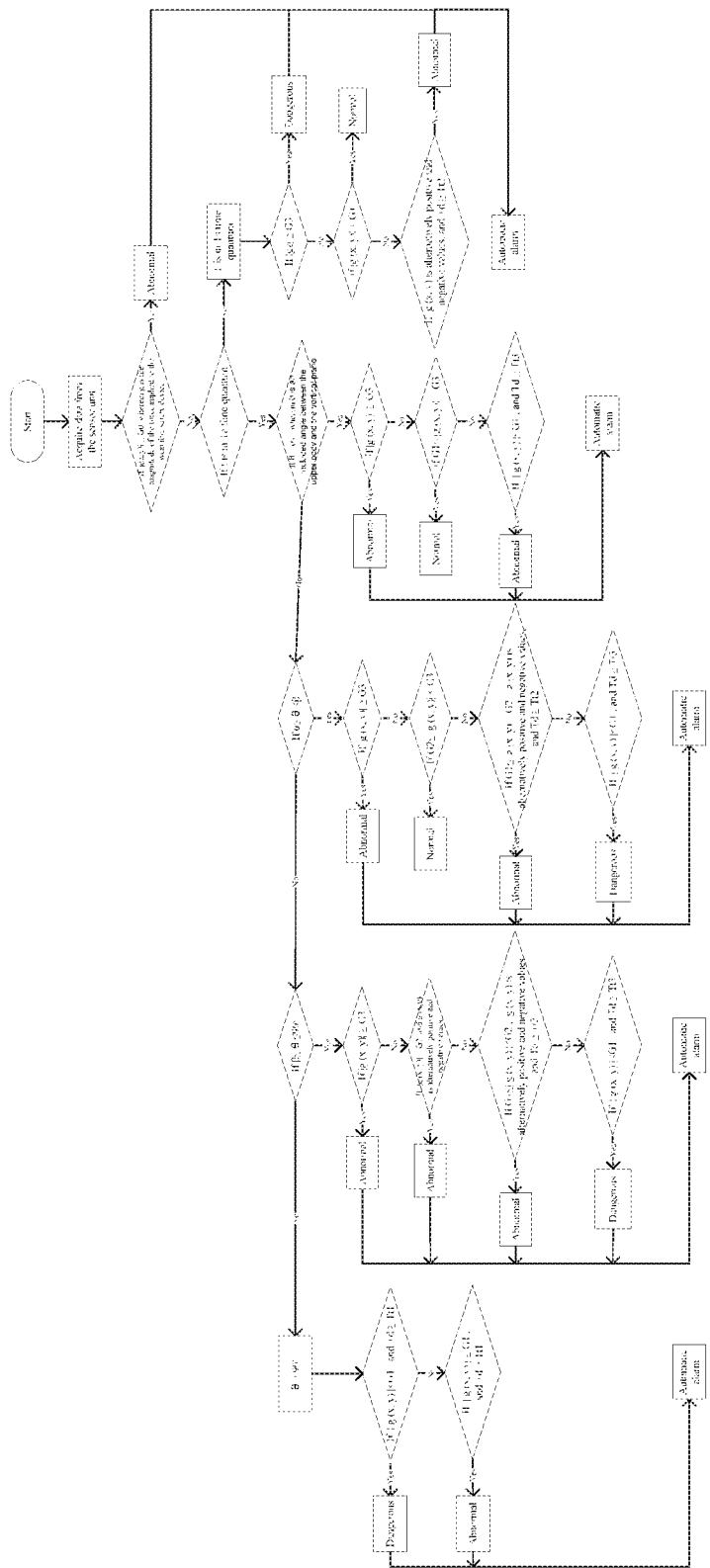
FIG. 4 is a flow chart of an automatic alarm.

An automatic alarm flow may be shown in FIG. 4.

The sensing unit is used for detecting the posture and the motion of a human body and the condition of the external force directly applied to the wearable safety device in real time and converting detected data to an electrical signal; the processing unit is used for collecting the signal, calculating θ and g values and carrying out analysis processing with combination of time so as to make correct judgpeoplet; and the processing process after judgpeoplet is in communication interaction with the rescue mobile phones through the communication unit, wherein the wearable safety device with the non-independent design is in indirect communication interaction with the rescue mobile phones through the auxiliary mobile phones.

Following parameters and values are defined as follows:

1. θ: an included angle between an upper body of a human body and a vertical plane, taking an absolute value. α, β: two thresholds of θ. $0°≤θ≤180°$, $0°<α<β<90°$.

2. g: the intense degree of an action of a wearable safety device user or the magnitude of the external force directly applied to the device. gx, gy and gz: components of g in an x axis, a y axis and a z axis of a space rectangular coordinate system respectively (the coordinate system is stationary), and g (x, y): gx or gy. G0, G1, G2 and G3: four thresholds of g, $0<G0<G1<G2<G3$.

3. t: current time. T: a motion or reset time quantum of the wearable safety device user in a day. Ta: motion time quantum, and Ts: rest time quantum. t and T: both ranging from 00:00 to 24:00. Td: duration of g in some threshold interval; Tt1, Tt2 and Tt3: three thresholds of Td in seconds, $0<Tt1<Tt2<Tt3$. The T value may be set by the rescue mobile phones, the auxiliary mobile phones or a computer.

When the condition is judged to be normal, the wearable safety device does not make any reaction.

When the condition is judged to be abnormal, the wearable safety device automatically starts an abnormal alarm program: starting the camera and the microphone to work, recording a video and audio signal, sending the current position and date and time information at the same time, calling the rescue mobile phone preset in the device with a prompt of vibration, vibration and voice or voice (which may be set through the rescue mobile phones, the auxiliary mobile phones or the computer), sequentially calling a next rescue mobile phone if the previous rescue mobile phone does not get through within a certain time and keeping going until one rescue mobile phone gets through (if no mobile communication signal exists at the time, stopping calling, closing the camera and the microphone with a time lag and starting the alarm program again until the signal exists).

After the rescue mobile phone gets through, the wearable safety device stops recording the video and audio signal and turns to carry out real-time video and audio communication with the rescue mobile phone. The called rescue mobile phone may generate vibration and/or sound alarm and may store communication contents when carrying out real-time communication. At the same time, the wearable safety device continuously sends the position and the date and time information to the rescue mobile phones periodically, and the electronic maps in the APP running in the backgrounds of the rescue mobile phones receive and store the information. A rescue mobile phone user may switch to the electronic map as needed, the position, corresponding to date and time, is displayed on the map, and a path is generated automatically. After real-time communication, video and audio contents recorded by the wearable safety device previously may be sent to the rescue mobile phone (used for purposes of evidences in some cases, etc.).

When the condition is judged to be dangerous, a processing mode is basically same as a processing mode when the condition is judged to be abnormal, and the difference is that an alarm sound and vibration generated by the APP of the called rescue mobile phone are different from those when the condition is judged to be abnormal, the voice may be more urgent, and vibration may be stronger.

If the judgpeoplet criterion of the alarm does not change after the rescue mobile phone responds to the alarm, the same alarm which may be generated subsequently may be shielded; and if the judgpeoplet criterion changes, the same alarm generated subsequently may be started again.
The automatic alarm in the rest period may be set in a shielding state through the rescue mobile phones or the auxiliary mobile phones so as to meet the condition that some persons do not want to use the wearable safety device in the period.

III. In a non-automatic alarm state, if needed, a rescue mobile phone user may send a command through the APP to start and close the camera and the microphone of the wearable safety device and carry out real-time video and audio communication with the device user or only look over monitoring data and may store the monitoring data. When the camera and the microphone of the wearable safety device are started and closed, the wearable safety device may send a prompt through vibration, vibration and voice or voice to respect the user and protect privacy of the user, and vibration and voice may be set by the rescue mobile phone.

INDUSTRIAL APPLICABILITY

A product produced according to the patent is very strong in industrial applicability, may be produced in a large scale, may help people seek aid rapidly when encountering various dangerous circumstances and abnormal conditions and may also be used for other more purposes in normal times.

What is claimed is:
1. A wearable safety device, comprising a processing unit, a positioning unit, a sensing unit, a communication unit, a power supply unit, a camera, a microphone and a loudspeaker, wherein the positioning unit, the sensing unit, the communication unit, the power supply unit and the camera are connected with the processing unit;

wherein the processing unit is configured to:
calculate a g value and an included angle θ between an upper body of a human body and a vertical plane according to data detected by the sensing unit, wherein the g value is a magnitude of a force applied to the wearable safety device;
compare a value of the included angle θ, the g value, a duration value respectively with corresponding threshold values of the included angle θ, the g and the duration to judge a current condition: whether a human body is in a normal state, an abnormal state or a dangerous state; wherein an automatic alarm is carried out when the human body is in the abnormal state or the dangerous state;
the processing unit is further configured to:
start the camera and the microphone to work;
send a current position and date and time information at a same time;
dial a preset rescue mobile phone number in the device;
sequentially dial a next rescue mobile phone number preset if a previous rescue mobile phone number does not get through within a time period;
continue calling until a rescue mobile phone gets through;
wherein if no mobile communication signal exists, stop dialing, close the camera and the microphone with a time lag and start an alarm program again until a signal exists;
carry out real-time video and audio communication with the rescue mobile phone after the rescue mobile phone gets through;
meanwhile, continuously and periodically send a position and a date and time information to the rescue mobile phones,
record a video and audio signal when the camera and the microphone are started and
send a record to the rescue mobile phone after real-time communication;
wherein the g value is divided into components in an x axis, a y axis and a z axis in a space rectangular coordinate system respectively; θ is an included angle between the upper body of the human body and the vertical plane, taking an absolute value; and $0° \leq \theta \leq 180°$.

2. The wearable safety device of claim 1, wherein the wearable safety device further comprises an emergency press key.

3. The wearable safety device of claim 1, wherein the wearable safety device further comprises a storage unit.

4. The wearable safety device of claim 1, wherein the wearable safety device further comprises a vibrator.

5. The wearable safety device of claim 1, wherein the sensor unit comprises an accelerometer and a gyroscope.

6. The wearable safety device of claim 1, wherein
a system is formed by the wearable safety device together with a smart phone;
an APP matched with the wearable safety device is installed in the smart phone;
the smart phone comprises a rescue mobile phone configured to accept a final alarm and an auxiliary mobile phone configured to call the rescue mobile phone as a communication relay;
the wearable safety device comprises two kinds of design: a first kind is a wearable safety device with independent design, wherein
the wearable safety device with independent design is composed of: the processing unit, the positioning unit, the sensing unit, the communication unit, the camera, the microphone, the loudspeaker, the power supply, and may further comprises a emergency press key, a storage unit and a vibrator;

the wearable safety device with independent design communicates with the rescue mobile phone directly;

the communication unit comprises 3G and/or 4G;

the sensing unit comprises an accelerometer and a gyroscope;

a second kind is wearable safety device with non-independent design, wherein the wearable safety device with non-independent design is a same design as the wearable safety device with the independent design except for the communication unit, wherein the communication unit of the wearable safety device with non-independent design comprises a bluetooth, and the wearable safety device with non-independent design communicates with the rescue mobile phone through the auxiliary mobile phone.

7. A method suitable for the wearable safety device of claim 1, wherein the processing unit is configured to perform a processing method comprising:

calculating a g value and an included angle θ between an upper body of a human body and a vertical plane according to data detected by the sensing unit, wherein the g value is the magnitude of the force applied to the wearable safety device;

distinguishing a time interval, comparing a θ value, the g value, a duration respectively with corresponding threshold values of the θ value, the g value and the duration to judge a current condition: whether a human body is in a normal state, an abnormal state or a dangerous state; wherein an automatic alarm is carried out when the human body is in the abnormal state or the dangerous state;

a program of the automatic alarm comprises the following steps:

starting the camera and the microphone to work, sending a current position and date and time information at a same time, dialing a rescue mobile phone number preset in the device, sequentially dialing a next rescue mobile phone number if a previous rescue mobile phone does not get through within a time period, keeping dialing until a rescue mobile phone gets through, wherein if no mobile communication signal exists, stop dialing, close the camera and the microphone with a time lag and start an alarm program again until a signal exists, carrying out real-time video and audio communication with the rescue mobile phone after the rescue mobile phone gets through; and meanwhile, continuously and periodically sending the position and the date and time information to the rescue mobile phones, recording a video and audio signal when the camera and the microphone are started and sending a record to the rescue mobile phone after real-time communication;

the g value is divided into components gx, gy and gz in an x axis, a y axis and a z axis in a space rectangular coordinate system respectively and gx, gy and gz are positive or negative values.

8. The method of claim 7, wherein the time interval is divided into an active time interval Ta and a rest time interval Ts;

wherein the time interval is the active time interval Ta when a user is active during a day; and the time interval is the rest time interval Ts when the user is at rest.

9. The method of claim 7, wherein a posture of the human body is divided into several different states according to different included angles between the upper body of the human body and the vertical plane.

10. The method of claim 7, wherein if a judgement criterion of the automatic alarm does not change after the rescue mobile phone responds to the automatic alarm, a same alarm generated subsequently is shielded; and if the judgement criterion changes, a same alarm generated subsequently is started again.

* * * * *